US006711036B2

(12) United States Patent
Winter

(10) Patent No.: US 6,711,036 B2
(45) Date of Patent: Mar. 23, 2004

(54) APPARATUS AND METHOD FOR INDEPENDENTLY OPERATING A PLURALITY OF AC VOLTAGE SOURCES IN PARALLEL

(76) Inventor: Rick Winter, 6724 #C Preston Ave., Livermore, CA (US) 94550

( * ) Notice: Subject to any disclaimer, the term of this patent is extended or adjusted under 35 U.S.C. 154(b) by 0 days.

(21) Appl. No.: 09/899,749

(22) Filed: Jul. 5, 2001

(65) Prior Publication Data

US 2003/0007374 A1 Jan. 9, 2003

(51) Int. Cl.[7] .............................. H02M 7/00; H02J 9/06
(52) U.S. Cl. ........................................... 363/65; 307/66
(58) Field of Search .............................. 363/65, 67, 69, 363/70, 71, 72; 307/66, 87

(56) References Cited

U.S. PATENT DOCUMENTS 4,665,322 A * 5/1987 Eishima et al. ................ 307/66
5,075,565 A * 12/1991 Severinsky et al. ........... 307/66

* cited by examiner

Primary Examiner—Jessica Han

(57) ABSTRACT

A voltage source capable of coupling in parallel to at least one second voltage source, the second voltage source having an AC waveform to power at least one load. The voltage source includes a power supply and a controller. The controller is associated with the power supply. The controller includes an AC waveform generator which is capable of providing a waveform to an output, a sensor for sensing the AC waveform produced by the second voltage source and a member for phase shifting the AC waveform to synchronize same to the AC waveform of the second voltage source.

15 Claims, 2 Drawing Sheets

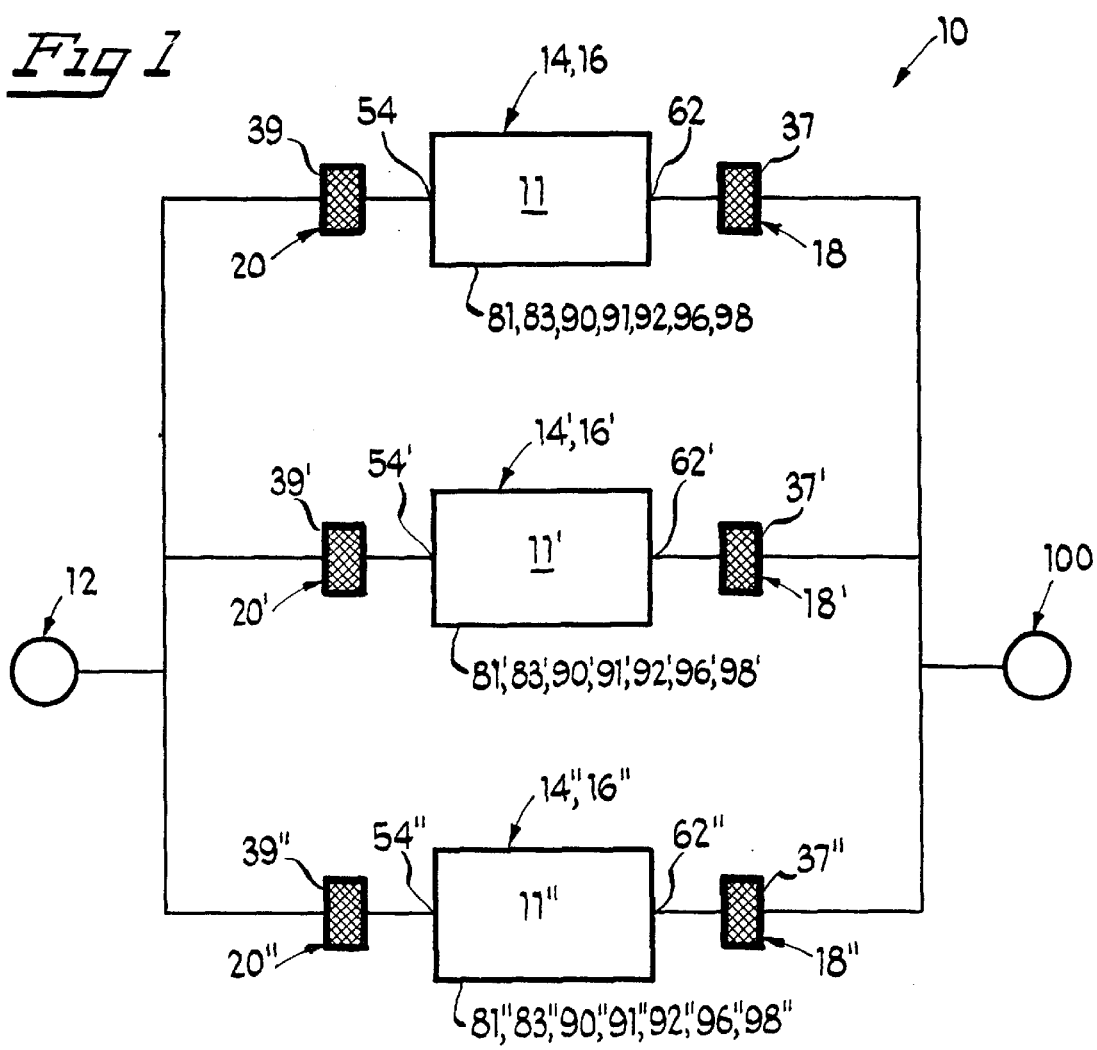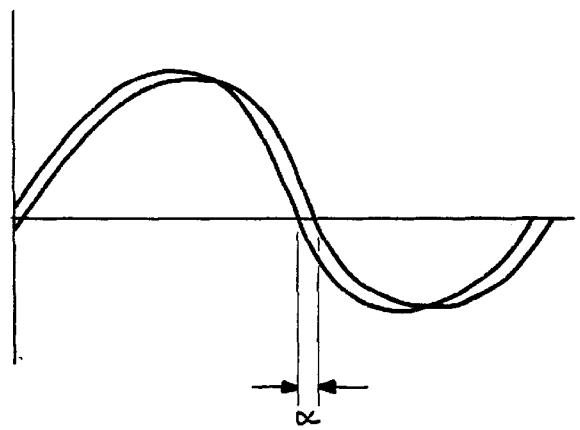

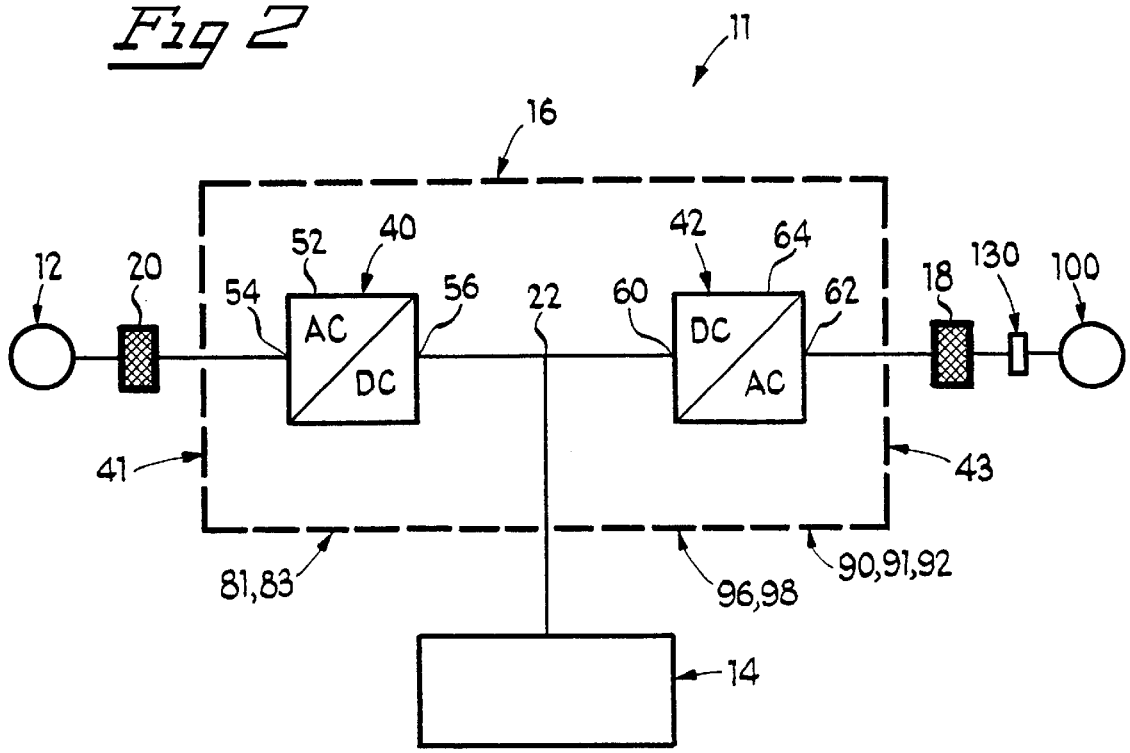
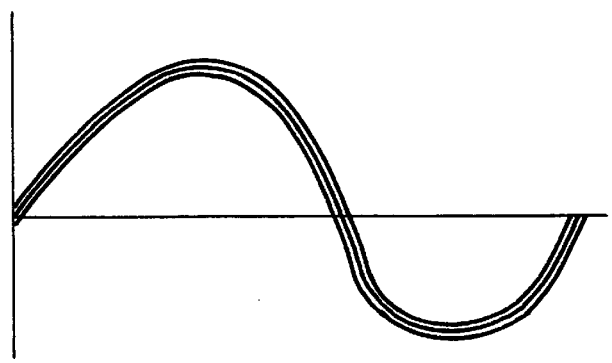

APPARATUS AND METHOD FOR INDEPENDENTLY OPERATING A PLURALITY OF AC VOLTAGE SOURCES IN PARALLEL

BACKGROUND OF THE INVENTION

1. Field of the Invention

The invention is directed primarily to the providing of electrical power, and more particularly to an apparatus and method for independently operating a plurality of AC voltage sources in parallel.

2. Background Art

The use of energy by residential and industrial customers is at an all time high. In particular, industry often works three shifts and heavy usage of electrical power to drive energy consuming lighting and machinery is constant.

To provide quality power to an installation, free of disturbances and power interruptions, it is possible to utilize a power system which has the ability to combine electrical power from one of a storage device (i.e. battery) and an outside power supply (i.e. grid power from a utility). Such a power source is capable of generating an AC voltage waveform free of disturbances and interruptions as output. In certain instances, it may become necessary or desirable to have multiple power systems attached in parallel to power a single load (i.e., a single factory).

As voltage sources, combining the power systems together in parallel has proven difficult inasmuch as the variations in the generated AC waveforms typically conflict with each other which can lead to catastrophic failure in the power supplies. Moreover, the independent operation, activation and deactivation of such systems independent of each other would pose more difficulties and conflicts.

Thus, it is an object of the invention to combine AC voltage sources together in parallel.

It is likewise an object of the invention to facilitate the independent operation of the separate AC voltage sources.

SUMMARY OF THE INVENTION

A voltage source capable of being coupled in parallel to at least one second voltage source, having an AC waveform, to power at least one load. The voltage source comprises a power supply and a controller. The controller is associated with the power supply and includes an AC waveform generator, sensing means and shifting means. The AC waveform generator is associated with the power supply, and is capable of providing a waveform to an output. The sensing means senses the AC waveform produced by a second voltage source. The phase shifting means is associated with the AC waveform generator and with the sensing means. The phase shifting means phase shifting the AC waveform generated by the AC waveform generator, to, in turn, synchronize same to the AC waveform of the second voltage source.

In a preferred embodiment, the voltage source further includes means for buffering the output of the at least one second voltage source, to, in turn, facilitate the phase shifting of the AC waveform by the phase shifting means. In one such embodiment, the buffering means comprises an isolation transformer associated with the output.

In a preferred embodiment, an outside power source is associated with the controller. In one such embodiment, the outside power source is associated with the controller, the voltage source further comprising means for protecting the outside power source from disturbances. In one such embodiment the protecting means comprises an isolation transformer associated with the input. In another such embodiment, the controller further includes means for controlling the distribution of power between the outside power supply, the power supply and the load. In one embodiment, the controlling means further includes means for directing power from the outside power supply to at least one of the power supply and the load. In another embodiment, the controlling means further includes means for directing power from the power supply to the load.

The invention further comprises a method for attaching at least two voltage sources in parallel. The method comprises the steps of (a) providing a first voltage source; (b) supplying an AC waveform from the first voltage source to a load; (c) supplying a second voltage source; (d) supplying an AC waveform from the second voltage source to the load; (e) sensing the AC waveform generated by the first voltage source; and (f) phase shifting the AC waveform generated by the second voltage source, so that the two AC waveforms are substantially in phase.

In a preferred embodiment, the method further comprises the step of buffering voltage sources, to in turn, provide sufficient time for the step of phase shifting.

In another preferred embodiment, the method further comprises the step of attaching a first voltage source to an outside power supply. In one such embodiment, the method further comprises the step of protecting the outside power supply.

In a preferred embodiment, the method further comprises the step of attaching at least a third power supply to the at least two power supplies. In one such embodiment, the step of attaching further comprises the steps of (a) supplying a third voltage source; (b) supplying an AC waveform from the third voltage source to the load; (c) sensing the AC waveform generated by at least one of the first voltage source and the second voltage source; and (d) phase shifting the AC waveform generated by the third voltage source, so that the three AC waveforms are substantially in phase relative to each other.

BRIEF DESCRIPTION OF THE DRAWINGS

FIG. 1 of the drawings is a schematic representation of the electrical power providing system of the present invention;

FIG. 2 of the drawings is a schematic representation of a voltage source of the electrical power providing system of the present invention;

FIG. 3 of the drawings is graph showing a pair of voltage waveforms from two different voltage sources in synchronization; and FIG. 4 of the drawings is a graph showing three voltage waveforms from three different voltage sources in synchronization.

BEST MODE FOR PRACTICING THE INVENTION

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

Electric power providing system 10 is shown in FIG. 1 as comprising a plurality of voltage sources, such as first voltage source 11, which, in turn, includes DC power supply 14, converter control system 16, means 18 for buffering the output of the voltage source and means 20 for protecting outside power supply 12. As shown in FIG. 1, each of the voltage sources 11, 11', 11", etc, are attached to each other in parallel. It will be understood, the invention is not limited to a particular quantity of voltage sources, and that three voltage sources are shown for illustration purposes only.

As will be explained in detail below, converter control system 16 of each voltage source controls the conversion of outside power supply 12, incorporation of DC power supply and the reconversion of the combined power supplies from DC to AC to power load 100 and likewise facilitates the independent association of the voltage sources in parallel.

Specifically, converter control system 16 of first voltage source 11 is shown in FIG. 2 as including AC to DC converter 40, junction 22, DC to AC converter 42 and controller 43. The AC to DC converter 40 comprises a solid state switching circuitry 52, input connection 54 and output 56. Solid state switching circuitry generally operates in the range of 9 kHz to 30 kHz, and preferably above 12 kHz. With such frequency of operation, switching circuitry 52 has an efficiency of about 97%. Of course, the system is not limited to any particular efficiency, but, the higher efficiency, the higher the efficiency of the overall system. It will be understood that the power that is not converted from AC to DC is dissipated as heat.

Input connection 54 is shown in FIG. 1 as being electrically coupled to outside power supply 12. The outside power supply generally comprises a high voltage power source (i.e. 480V 3-phase supply), commonly known as grid power. Output connection 56 is shown in FIG. 1 as being electrically coupled to solid state switching circuitry. Output connection 56 is configured to provide DC power as converted by the solid state switching circuitry.

Junction 22 includes a connection which places DC output connection 56 in electrical association with DC power supply 14. DC to AC converter 42 comprises input 60, output 62 and solid state switching circuitry 64. Input 60 is coupled to junction 22 and is capable of receiving DC power. Solid state switching circuitry 64 operates in a range between 9 kHz and 30 kHz, and preferably above 12 kHz, and has an efficiency of about 97%. Of course, the solid state switching circuitry 64 is not limited to those operational ranges and efficiencies. Output 62 is then associated with a power consumption device such as a motor, a light emitter, etc.

Controller 41 is shown in FIG. 2 as comprising means 81 for controlling the conversion of DC into AC by DC to AC converter 42, and means 83 for controlling the distribution of power among outside power supply 12, power source 14 and any loads such as load 100 attached to DC to AC converter output 62.

In particular, conversion controlling means 81 comprises suitable microprocessor circuitry and software so as to provide means 90 for generating an AC waveform, means 91 for sensing load voltage and/or phase 130 and means 92 for phase shifting the generated AC waveform. While not limited to any particular form, the generating means will generally direct the DC to AC converter to produce a sine wave of 50 or 60 Hz (depending on the installation). The load voltage sensing means 91 senses the waveform, i.e., one or both of the voltage and the phase at the load, and, as will be explained below in detail, directs the phase shifting means 92 to phase shift the generated AC waveform. It will be understood that each voltage source 11, 11', 11", etc. operates at a substantially identical voltage, and is capable of generating a substantially identical AC waveform by the respective waveform generating means.

Power distribution controlling means 83 includes microprocessor circuitry and software which provide means 94 for directing power from outside power supply to one or both of power supply 14 and DC to AC converter 42 (and, in turn, load 100), means 96 for directing power from DC power supply 14 to DC to AC converter 42 and means 98 for minimizing cost of power from outside power supply 12.

Outside power supply directing means 94 is capable of directing power provided by outside power supply 12 to power supply 14 (i.e. charging situation), to DC to AC converter 42, or both. DC power supply directing means is capable of directing power provided by DC power supply to DC to AC converter.

DC power supply 14 may comprise any number of storage devices capable of storing an electrical charge. In one embodiment, the power supply may comprise one or more zinc/bromine batteries. Such batteries have been shown to be durable for extended periods of time. Indeed, they are capable of repeated charge and discharge cycles over a number of years. In other embodiments, the storage supply may comprise one or more capacitors, such as those available from Powercell under the trademark Ultracapacitor. In yet other embodiments, the storage supply may comprise one or more lead acid batteries, NiMH, NiCAD, Li-ion batteries. Each type of storage supply has unique advantages for particular applications. Additionally, the storage capability, capacity and other factors will vary for each type of storage device. It will be understood that the invention is not limited to the use of any particular type of storage supply device. Regardless of the type of storage supply utilized, the power supply includes junction connection 66 which is capable of electrically associating storage supply 14 to junction 22.

Buffering means 18 is shown in FIG. 1 as comprising isolation transformer 37. Isolation transformer 37 provides a buffer for output 62, which, as will be explained below, provides the required time to perform the necessary phase shifting of the generated waveform. Generally, the impedance of the isolation transformers of each of voltage sources 11, 11' and 11" are substantially identical.

Grid protection means 20 is shown in FIG. 1 as comprising isolation transformer 39. Isolation transformer 39 provides protection for outside power supply 12, by precluding the proliferation of common mode noise to outside power supply 12 which may be generated by the parallel operation of the voltage sources before the voltage sources are properly synchronized.

In operation, the user first begins to operate voltage source 11. Specifically, input connection 54 of AC to DC converter is attached to outside power supply 12 and output 62 of DC to AC converter 42 is attached to a load. Once properly attached, the voltage source will operate by providing supply power from one or both of outside power supply 12 or power supply 14. Controller 41, through generating means 92 will generate the desired AC waveform. Details relating to the supply of power by voltage source 11 is explained in detail in co-pending U.S. application Ser. No. 09/900,761, entitled "SYSTEM AND METHOD FOR PROVIDING ELECTRIC POWER."

Once the first voltage source 11 is operating, second voltage source 11' can be attached. In particular, upon attachment of second voltage source 11', AC generating means 90' of controller 41' generates an AC waveform identical to that of AC generating means 90 (incidentally, while the voltage is quickly ramped to 480 volts, to protect the systems, the current remains low until the waveforms have synchronized). Subsequently, sensing means 91 senses the waveform at the load and phase shifting means 92 alters the phase of the generated waveform so that the two waveforms are substantially in phase. As shown in FIG. 3, the particular phase relationship that is required is one wherein any phase shift, which is denoted by $\alpha$ is small enough so that the attached loads do not distinguish between the waveforms. The synchronization between the two waveforms is then deemed attained and the controlling means periodically or continuously senses load voltage/phase so as to insure that synchronization is maintained.

It will be understood that synchronization of AC waveforms is important; if the two waveforms are not properly synchronized, a catastrophic failure will result inasmuch as the two voltage sources will be in competition with each other. However, when synchronized, the voltage sources do not compete and instead operate together. With respect to power supplied to the loads, the loads generally do not distinguish between the waveforms due to the relatively minute phase shift (if any), and, instead deem the waveforms to be a single waveform.

During the initial synchronization, there may be a conflict between the load waveform 130 sensed by the sensing means and the waveform generated by generating means 90 of second voltage 20 source 11'. Buffering means 18 essentially provides a brief buffer between the two competing waveforms and precludes a catastrophic failure for a brief time period. The brief time period is generally enough time for phase shifting means 92' to shift the phase of the AC waveform generated by generating means 90' of voltage source 11' so that it is synchronized with the first voltage source.

Interestingly, an audible resonance can be observed in the buffering means as the waveforms are synchronized.

Additional voltage sources 11", etc. can be brought on-line (i.e. connected and activated) in similar manner. As further voltage sources are added, unlike the loads themselves, the load sensing means of the added voltage sources senses the AC waveform generated by the first and second voltage sources 11, 11'. Once the voltage waveforms are sensed, then phase shift means 92" of the voltage source 11" will shift the phase of the AC waveform generated by generating means 90" of the third voltage source so that it is synchronized to the first and second waveforms. A graphic representation of the three synchronized waveforms is shown in FIG. 4. It will be understood that additional voltage sources can be added as desired. Each successive voltage source will sense the generated waveforms and phase shift their own generated waveform so as to be synchronized with the others.

At any time, a voltage source can be removed, or, taken off-line. As one voltage source is a removed, the other voltage sources continue to operate. Indeed, the removal of a voltage source has virtually no impact on the operation of the other voltage sources.

Indeed, it will be understood that each voltage source is controlled solely by its own respective controller, and that no separate controller is required to oversee the entire system. In this manner, the voltage sources operate in unison and synchronization, however, the operation of each voltage source is independent and self controlled. Moreover, since the synchronization process is dependent on the voltage/phase at the load, the voltage sources can be brought on line regardless of the power supplied by outside power supply 12.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A voltage source capable of coupling in parallel to at least one second voltage source, the second voltage source having an AC waveform to power at least one load, the voltage source comprising:
   a power supply; and
   a controller associated with the power supply, the controller including:
      an AC waveform generator associated with the power supply, the AC waveform generator capable of providing a waveform to an output;
      means for sensing the AC waveform produced by a second voltage source;
      means associated with the AC waveform generator and with the sensing means for phase shifting the AC waveform generated by the AC waveform generator, to, in turn, synchronize same to the AC waveform of the second voltage source.

2. The voltage source of claim 1 further comprising means for buffering the output of the at least one second voltage source, to, in turn, facilitate the phase shifting of the AC waveform by the phase shifting means.

3. The voltage source of claim 2 wherein the buffering means comprises an isolation transformer associated with the output.

4. The voltage source of claim 1 wherein an outside power source is associated with the controller.

5. The voltage source of claim 4 wherein the outside power source is associated with the controller, the voltage source further comprising means for protecting the outside power source from disturbances.

6. The voltage source of claim 4 wherein the protecting means comprises an isolation transformer associated with the input.

7. The voltage source of claim 4 the controller further includes means for controlling the distribution of power between the outside power supply, the power supply and the load.

8. The voltage source of claim 7 wherein the controlling means further includes means for directing power from the outside power supply to at least one of the power supply and the load.

9. The voltage source of claim 7 wherein the controlling means further includes means for directing power from the power supply to the load.

10. A method for attaching at least two voltage sources in parallel, the method comprising the steps of:
    providing a first voltage source;
    supplying an AC waveform from the first voltage source to a load;
    supplying a second voltage source;
    supplying an AC waveform from the second voltage source to the load;
    sensing the AC waveform generated by the first voltage source; and
    phase shifting the AC waveform generated by the second voltage source, so that the two AC waveforms are substantially in phase.

11. The method according to claim 10 further comprising the step of buffering voltage sources, to in turn, provide sufficient time for the step of phase shifting.

12. The method according to claim 10 further comprising the step of attaching a first voltage source to an outside power supply.

13. The method according to claim 12 further comprising the step of protecting the outside power supply.

14. The method according to claim 10 further comprising the step of attaching at least a third power supply to the at least two power supplies.

15. The method according to claim 14 wherein the step of attaching further comprises the steps of:

supplying a third voltage source;

supplying an AC waveform from the third voltage source to the load;

sensing the AC waveform generated by at least one of the first voltage source and the second voltage source;

phase shifting the AC waveform generated by the third voltage source, so that the three AC waveforms are substantially in phase relative to each other.

* * * * *